US009444803B2

(12) United States Patent
Sun et al.

(10) Patent No.: US 9,444,803 B2
(45) Date of Patent: Sep. 13, 2016

(54) AUTHENTICATION METHOD AND SYSTEM ORIENTED TO HETEROGENEOUS NETWORK

(75) Inventors: Aifang Sun, Shenzhen (CN); Jianfu Cao, Shenzhen (CN); Zhihao Ling, Shenzhen (CN); Yifeng Yuan, Shenzhen (CN); Chong Gao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 110 days.

(21) Appl. No.: 14/371,826

(22) PCT Filed: Mar. 15, 2012

(86) PCT No.: PCT/CN2012/072367
§ 371 (c)(1),
(2), (4) Date: Jul. 11, 2014

(87) PCT Pub. No.: WO2013/104143
PCT Pub. Date: Jul. 18, 2013

(65) Prior Publication Data
US 2015/0012986 A1    Jan. 8, 2015

(30) Foreign Application Priority Data

Jan. 13, 2012  (CN) .......................... 2012 1 0011469

(51) Int. Cl.
G06F 7/04       (2006.01)
G06F 15/16      (2006.01)
(Continued)

(52) U.S. Cl.
CPC ................. *H04L 63/08* (2013.01); *H04L 9/32* (2013.01); *H04L 63/0807* (2013.01);
(Continued)

(58) Field of Classification Search
CPC  G06Q 20/36; G06Q 20/367; H04L 63/0815; H04L 63/0892; H04L 63/104; H04L 9/3213; H04L 63/0272; H04L 63/10; H04L 67/20; H04L 9/321; G06F 21/335; G06F 21/41; G06F 17/30566; H04W 12/06
See application file for complete search history.

(56) References Cited

U.S. PATENT DOCUMENTS 7,734,745 B2    6/2010   Gloe
8,346,924 B1    1/2013   Bucher et al.
(Continued)

FOREIGN PATENT DOCUMENTS

CN    1499396 A      5/2004
CN    102123394 A    7/2011
(Continued)

OTHER PUBLICATIONS

International Search Report in international application No. PCT/CN2012/072367, mailed on Oct. 25, 2012.
(Continued)

*Primary Examiner* — Amir Mehrmanesh
*Assistant Examiner* — Quy Pham
(74) *Attorney, Agent, or Firm* — Oppedahl Patent Law Firm LLC

(57) ABSTRACT

An authentication method and system oriented to a heterogeneous network are disclosed. After receiving a service request sent by a virtual terminal, a unified authentication platform generates a service token according to the service request, and sends the service token to the virtual terminal and a target network; the virtual terminal submits the service token to the target network, and requests the target network to provide service data; and the target network compares the service token submitted by the virtual terminal with the service token sent to the target network by the unified authentication platform, and provides the service data to the virtual terminal when the service token submitted by the virtual terminal is consistent with the service token sent to the target network by the unified authentication platform. By a unified authentication platform, the disclosure unifies authentication systems in a ubiquitous network, reduces huge signaling overhead and service delay in a heterogeneous network due to authentication, and improves authentication efficiency in the ubiquitous network.

20 Claims, 6 Drawing Sheets

(51) Int. Cl.
G06F 17/30 (2006.01)
H04L 29/06 (2006.01)
H04W 12/06 (2009.01)
H04L 9/32 (2006.01)
H04W 4/08 (2009.01)
H04L 29/08 (2006.01)
H04W 36/00 (2009.01)

(52) U.S. Cl.
CPC ........... *H04W 12/06* (2013.01); *H04L 63/065* (2013.01); *H04L 67/00* (2013.01); *H04W 4/08* (2013.01); *H04W 36/00* (2013.01)

(56) References Cited

U.S. PATENT DOCUMENTS

2004/0083306 A1    4/2004  Gloe
2006/0274695 A1*  12/2006  Krishnamurthi .... H04L 63/0807
                                                     370/331
2009/0067623 A1    3/2009  Lei
2009/0217048 A1*   8/2009  Smith ..................... H04L 63/06
                                                     713/176
2010/0125511 A1*   5/2010  Jouret ..................... G06F 21/10
                                                     705/26.1
2012/0060025 A1*   3/2012  Cahill ..................... H04L 63/08
                                                     713/155
2012/0207128 A1    8/2012  Wang
2013/0047218 A1    2/2013  Smith

FOREIGN PATENT DOCUMENTS

CN         102238544 A      11/2011
GB         2465885 A   *    6/2010   ......... H04L 12/5695

OTHER PUBLICATIONS

English Translation of the Written Opinion of the International Search Authority in international application No. PCT/CN2012/072367, mailed on Oct. 25, 2012.

Supplementary European Search Report in European application No. 12865315.1, mailed on Jul. 9, 2015.

* cited by examiner

AUTHENTICATION METHOD AND SYSTEM ORIENTED TO HETEROGENEOUS NETWORK

TECHNICAL FIELD

The disclosure mainly relates to the field of authentication technology, and in particular to an authentication method and system oriented to a heterogeneous network.

BACKGROUND

A feasible security authentication mechanism is essential for secure efficient transmission of service data by a virtual terminal in a heterogeneous network. Under the circumstance of a ubiquitous network, where a virtual terminal is in an environment with coexisting heterogeneous networks, effective solutions are yet to be provided for virtual-terminal authentication and collaborative authentication of a ubiquitous service by a heterogeneous network (of 3G, Wifi, WLAN, and the like), merge and authentication of ubiquitous service data, and authentication of a terminal device waiting to join the virtual terminal, etc.

SUMMARY

In view of this, it is desired that embodiments of the disclosure provide an authentication method and system oriented to a heterogeneous network, for virtual-terminal authentication and collaborative authentication of a ubiquitous service by a heterogeneous network, and authentication of ubiquitous service data by a virtual terminal, as well as authentication of a terminal device waiting to join a virtual terminal.

To this end, a technical solution of the disclosure is implemented as follows.

The disclosure provides an authentication method oriented to a heterogeneous network, including steps of:

after receiving a service request sent by a virtual terminal, generating, by a unified authentication platform, a service token according to the service request, and sending the service token to the virtual terminal and a target network;

submitting, by the virtual terminal, the service token to the target network, and requesting the target network to provide service data; and comparing, by the target network, the service token submitted by the virtual terminal with the service token sent to the target network by the unified authentication platform, and providing the service data to the virtual terminal when the service token submitted by the virtual terminal is consistent with the service token sent to the target network by the unified authentication platform.

In an embodiment of the disclosure, the unified authentication platform may generate a service token for a respective member terminal device in the virtual terminal; the respective member terminal device in the virtual terminal may submit the service token for the respective member terminal device to the target network; and the target network may perform service-token comparison and authentication for the respective member terminal device in the virtual terminal according to the service token for the respective member terminal device.

In an embodiment of the disclosure, the unified authentication platform may generate a unified service token for any member terminal device in the virtual terminal; when the virtual terminal submits the service token to the target network, the virtual terminal may submit the unified service token for any member terminal device in the virtual terminal to the target network; and the target network may perform service-token comparison and authentication for any member terminal device in the virtual terminal according to the unified service token submitted by the virtual terminal.

In an embodiment of the disclosure, when the unified authentication platform generates the service token, the unified authentication platform may provide a separate service token for an individual member terminal device in the virtual terminal, and provide a unified service token for any member terminal device in the virtual terminal other than the individual member terminal device in the virtual terminal provided with the separate service token; a member terminal device in the virtual terminal provided with the unified service token may submit the unified service token to the target network; and the member terminal device in the virtual terminal provided with the separate service token may submit the separate service token to the target network; and the target network may perform service-token comparison and authentication for a member terminal device in the virtual terminal provided with the unified service token according to the unified service token submitted by the virtual terminal, and perform service-token comparison and authentication for the member terminal device in the virtual terminal provided with the separate service token according to the separate service token submitted by the member terminal device in the virtual terminal provided with the separate service token.

In an embodiment of the disclosure, the method may further include a step of:

when the target network compares and authenticates the service token submitted by the virtual terminal, issuing, by the target network, service data to a corresponding member terminal device according to the service token submitted by the virtual terminal.

In an embodiment of the disclosure, after the virtual terminal obtains the service data provided by the target network, the virtual terminal may aggregate the service data internally according to the service token.

In an embodiment of the disclosure, the method may further include steps of: when a terminal device requires to join the virtual terminal, after receiving a request for joining the virtual terminal from the terminal device requiring to join the virtual terminal, determining, by the unified authentication platform, according to a call request sent by the virtual terminal, whether the terminal device requiring to join the virtual terminal meets a requirement of the virtual terminal, wherein the request for joining the virtual terminal includes at least: an identifier and a capability of the terminal device requiring to join the virtual terminal; and a type of a network accessed by the terminal device requiring to join the virtual terminal;

when the terminal device requiring to join the virtual terminal meets the requirement of the virtual terminal, sending, by the unified authentication platform, the service token to the terminal device requiring to join the virtual terminal and the virtual terminal;

submitting, by the terminal device requiring to join the virtual terminal, the service token to the virtual terminal; and authenticating, by the virtual terminal, the service token submitted by the terminal device requiring to join the virtual terminal according to the service token sent to the virtual terminal by the unified authentication platform, and admitting the terminal device requiring to join the virtual terminal as a member terminal device in the virtual terminal when the service token submitted by the terminal device requiring to join the virtual terminal is authenticated.

In an embodiment of the disclosure, the method may further include steps of: after receiving the service request sent by the virtual terminal, authenticating, by the unified authentication platform, whether a target network is capable of providing service data required by a member terminal device in the virtual terminal according to a list of radio resources accessed by the member terminal device in the service request; and determining, according to an identifier of the virtual terminal and an identifier of the member terminal device in the virtual terminal in the service request, whether the virtual terminal and the member terminal device is authorized to download service data from the target network; and when the target network is capable of providing the service data required by the member terminal device and the virtual terminal and the member terminal device is authorized to download the service data from the target network, generating, by the unified authentication platform, the service token.

In an embodiment of the disclosure, the service token may be generated by the unified authentication platform by collecting information on context of a user, the virtual terminal, a network and the service data and computing with an encryption algorithm, wherein the service token may include at least information on: a name of the user, an identifier of the virtual terminal, an identifier of a member terminal device, a capability of the member terminal device, a radio resource accessed by the member terminal device, a name of a service being performed, a type of the service, a service data identifier, and authorization to download the service data.

The disclosure further provides an authentication system oriented to a heterogeneous network, including a unified authentication platform, a virtual terminal, and a target network, wherein the unified authentication platform is configured for receiving a service request sent by a virtual terminal, generating a service token according to the service request, and sending the service token to the virtual terminal and a target network;

the virtual terminal is configured for: sending the service request to the unified authentication platform; after receiving the service token sent by the unified authentication platform, submitting the service token to the target network, and requesting the target network to provide service data; and the target network is configured for: comparing the service token submitted by the virtual terminal with the service token sent to the target network by the unified authentication platform, and providing the service data to the virtual terminal when the service token submitted by the virtual terminal is consistent with the service token sent to the target network by the unified authentication platform.

In an embodiment of the disclosure, the unified authentication platform may generate a service token for a respective member terminal device in the virtual terminal; the respective member terminal device in the virtual terminal may submit the service token for the respective member terminal device to the target network; and the target network may perform service-token comparison and authentication for the respective member terminal device in the virtual terminal according to the service token for the respective member terminal device.

In an embodiment of the disclosure, the unified authentication platform may generate a unified service token for any member terminal device in the virtual terminal; when the virtual terminal submits the service token to the target network, the virtual terminal may submit the unified service token for any member terminal device in the virtual terminal to the target network; and the target network may perform service-token comparison and authentication for any member terminal device in the virtual terminal according to the unified service token submitted by the virtual terminal.

In an embodiment of the disclosure, the unified authentication platform may provide a separate service token for an individual member terminal device in the virtual terminal, and provide a unified service token for any member terminal device in the virtual terminal other than the individual member terminal device in the virtual terminal provided with the separate service token; a member terminal device in the virtual terminal provided with the unified service token may submit the unified service token to the target network; and the member terminal device in the virtual terminal provided with the separate service token may submit the separate service token to the target network; and the target network may perform service-token comparison and authentication for a member terminal device in the virtual terminal provided with the unified service token according to the unified service token submitted by the virtual terminal, and perform service-token comparison and authentication for the member terminal device in the virtual terminal provided with the separate service token according to the separate service token submitted by the member terminal device in the virtual terminal provided with the separate service token.

In an embodiment of the disclosure, the unified authentication platform may be located at a core network layer, and include a user-terminal managing module, a network-service managing module and a service-token managing module, wherein the user-terminal managing module may be configured for: receiving the service request sent by the virtual terminal, and authenticating information on identities and authorizations of a user and the virtual terminal; helping management of the virtual terminal by a controlling terminal in the virtual terminal; and authenticating a terminal device requiring to join the virtual terminal, and determining whether the terminal device requiring to join the virtual terminal is authorized to join the virtual terminal;

the network-service managing module may be configured for: receiving and authenticating the service request sent by the virtual terminal; and responding to the service request of the user by authenticating information on service content, service data and a service attribute and completing collaborative download in the virtual terminal for a service involving a heterogeneous network; and the service-token managing module may be configured for generating, authenticating and managing the service token, wherein the service token is generated by the unified authentication platform by collecting information on context of the user, the virtual terminal, a network and a service and computing with an encryption algorithm, wherein the service token includes at least information on: a name of the user, an identifier of the virtual terminal, an identifier of a member terminal device, a capability of the member terminal device, a radio resource accessed by the member terminal device, a name of the service being performed, a type of the service, a service data identifier, and authorization to download the service data.

In an embodiment of the disclosure, the virtual terminal may include a controlling terminal and a member terminal device, wherein the controlling terminal may be configured for: managing the member terminal device; providing the virtual terminal with a collaborative management capability including storing information on a status in performing a service and a capability of the member terminal device; sending the service request to the unified authentication platform; admitting a terminal device as a member terminal device with the help of the unified authentication platform; and formulating a service-transmission-by-streams strategy according to authorization of the service token, and downloading required service data from a network side; and the member terminal device may be configured for: carrying out the service-transmission-by-streams strategy of the controlling terminal through the service token; collaborating with the controlling terminal in completing a service task; and collaborating with the controlling terminal in completing service aggregation within the virtual terminal.

With a unified authentication platform proposed by the disclosure, existing problems of diversified authentication systems, complicate authentication, huge signaling overhead, difficulty in security risk assessment due to multiple heterogeneous terminal devices, multiple heterogeneous networks and diversified services. With a proposed unified authentication platform, the disclosure unifies authentication systems in a ubiquitous network, reduces huge signaling overhead and service delay in a heterogeneous network due to authentication, and improves authentication efficiency in the ubiquitous network.

DETAILED DESCRIPTION

To clearly show a technical problem to be solved, a technical solution, and beneficial effects of the disclosure, the disclosure is further elaborated below with reference to embodiments and the drawings.

Figure 1:
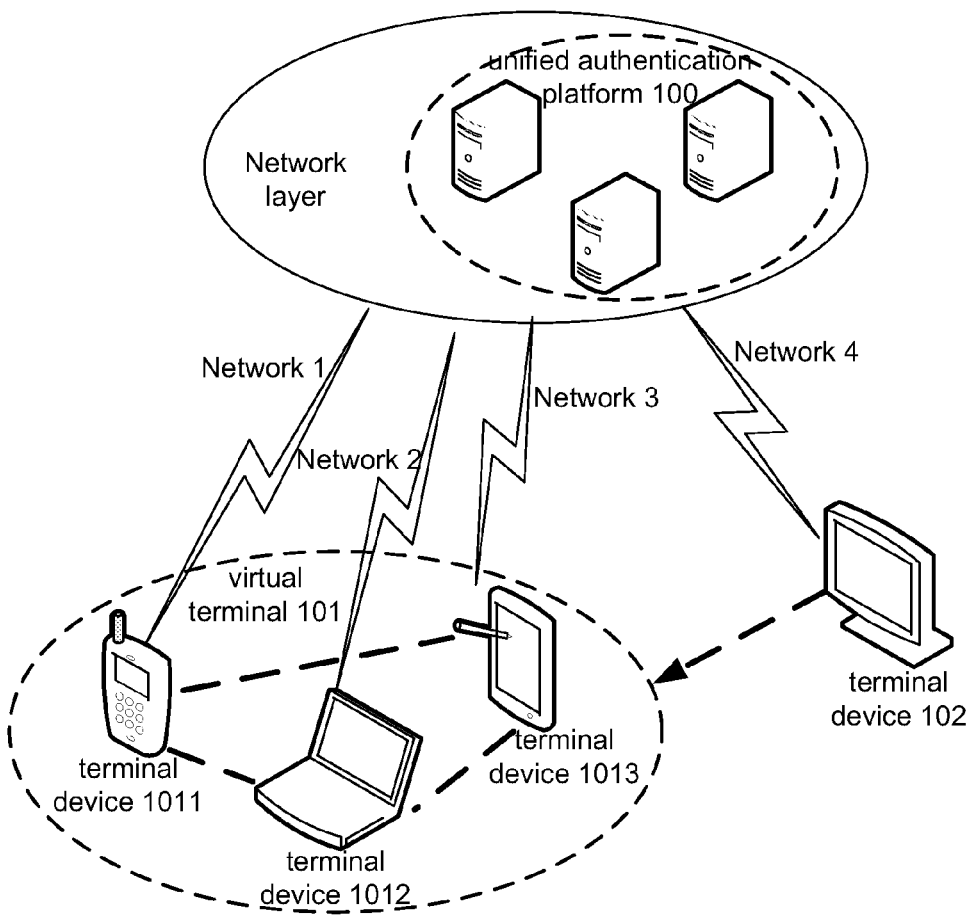
FIG. 1 is an architecture diagram of a heterogeneous-network authentication system according to the disclosure.

FIG. 1 is an architecture diagram of a heterogeneous-network authentication system. The heterogeneous-network authentication system consists of a unified authentication platform 100, a virtual terminal 101 and a target network.

The unified authentication platform 100 is configured to perform security authentication on a heterogeneous network, the virtual terminal and a ubiquitous service.

The unified authentication platform 100 may be located at a core network layer of a ubiquitous network, and may consist of multiple authentication servers each including a user-terminal managing module, a network-service managing module and a service-token managing module.

The unified authentication platform 100 can perform authentication for enrolling a terminal device 102 in virtual terminal 101. The virtual terminal may configure a terminal environment according to a ubiquitous service requirement of a user, when the terminal device 102 requests to join the virtual terminal 101 in response to a service request of the user, the terminal device 102 may send a joining request to the unified authentication platform 100. The unified authentication platform 100 may verify whether terminal device 102 meets the ubiquitous service requirement by calculating an extent to which a target set matches a candidate set using a fuzzy matching algorithm, where the target set may be set as a required terminal capability of the virtual terminal, and the candidate set may be set as a capability of the terminal device requesting to join the virtual terminal. If terminal device 102 meets the ubiquitous service requirement, the unified authentication platform 100 may send a service token to the terminal device 102, and inform virtual terminal 101 of the service token. The virtual terminal 101 may perform an operation of admitting terminal device 102 as a member terminal device by authenticating the service token of the terminal device 102.

The unified authentication platform 100 can perform authentication for downloading and aggregating a ubiquitous service according to a service requirement of the virtual terminal 101. After the virtual terminal 101 sends a ubiquitous service request, the unified authentication platform 100 may authenticate each target network (i.e., a network providing the ubiquitous service) according to the ubiquitous service request, and determine whether a target network grants the virtual terminal 101 authorization for the service. After determining that the virtual terminal 101 is granted the authorization for the service, the unified authentication platform may issue a service token to each member terminal device in the virtual terminal, and inform each target network of the service token. Each member terminal device in the virtual terminal may download data from each target network with a service token. After service data are downloaded, a controlling terminal in the virtual terminal aggregates the service data according to a service token of each member terminal device.

The virtual terminal 101 may include controlling terminal 1011 and a member terminal device.

The controlling terminal 1011 may be configured to manage a member terminal device, provide the virtual terminal 101 with a collaborative management capability including storing information on a status in performing a service and on a capability of the member terminal device, take charge of all operations by the virtual terminal 101, send a service request to the unified authentication platform 100, admit a terminal device as a member terminal device with the help of the unified authentication platform 100, and formulate a service-transmission-by-streams strategy according to authorization of a service token.

A member terminal device can carry out the service-transmission-by-streams strategy of the controlling terminal 1011 through a service token, collaborate with the controlling terminal 1011 in completing a service task, and aggregate requested service data within the virtual terminal according to a service data identifier in the service token to form a service and provide the service to the user.

The target network is configured to compare a service token submitted by the virtual terminal with a service token sent to the target network by the unified authentication platform, and provide service data to the virtual terminal when the service token submitted by the virtual terminal is consistent with the service token sent to the target network by the unified authentication platform.

Figure 2:
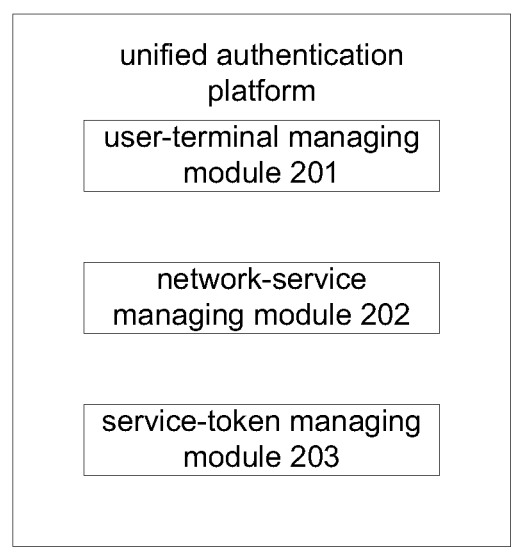
FIG. 2 is a diagram of a structure of a unified authentication platform according to the disclosure.

FIG. 2 is a diagram of a structure of a unified authentication platform. The unified authentication platform 100 may include a user-terminal managing module 201, a network-service managing module 202 and a service-token managing module 203.

The user-terminal managing module 201 may be configured for: receiving a service request sent by a virtual terminal 101, and authenticating, in response to the service request of a user, information on identities and authorizations of the user and the virtual terminal; helping management of the virtual terminal by a controlling terminal; and authenticating a terminal device requiring to join the virtual terminal, and determining whether the terminal device requiring to join the virtual terminal is authorized to join the virtual terminal.

The network-service managing module 202 may be configured for: receiving and authenticating a service request sent by a virtual terminal and a user; and responding to the service request of the user by authenticating information on service content, service data and a service attribute and completing collaborative download in the virtual terminal for a service involving a heterogeneous network.

The service-token managing module 203 may be configured for generating, authenticating and managing a service token, wherein the service token is generated by the unified authentication platform by collecting information on context of a user, a virtual terminal, a network (including a network where a terminal device is located and a target network) and a service and by computing with an encryption algorithm (such as an asymmetric encryption algorithm RSA). A service token is a medium by which a heterogeneous-network authentication system performs authentication. When an object waiting to be authenticated sends a service token to an authenticating party, the authenticating party first decrypts the service token to obtain detailed information included therein, and compares the detailed information with information sent by the unified authentication platform. If the comparison gives consistent results, then the object is authenticated and the requested service is performed. Or if the comparison gives inconsistent results, then the object fails to pass the authentication. The service token should include at least information on: a name of the user, an identifier of the virtual terminal to which the service token belongs, an identifier of a member terminal device, a capability of the member terminal device, a radio resource accessed by the member terminal device, a name of the service being performed, a type of the service, a service data identifier, and authorization to download the service data.

Figure 3:
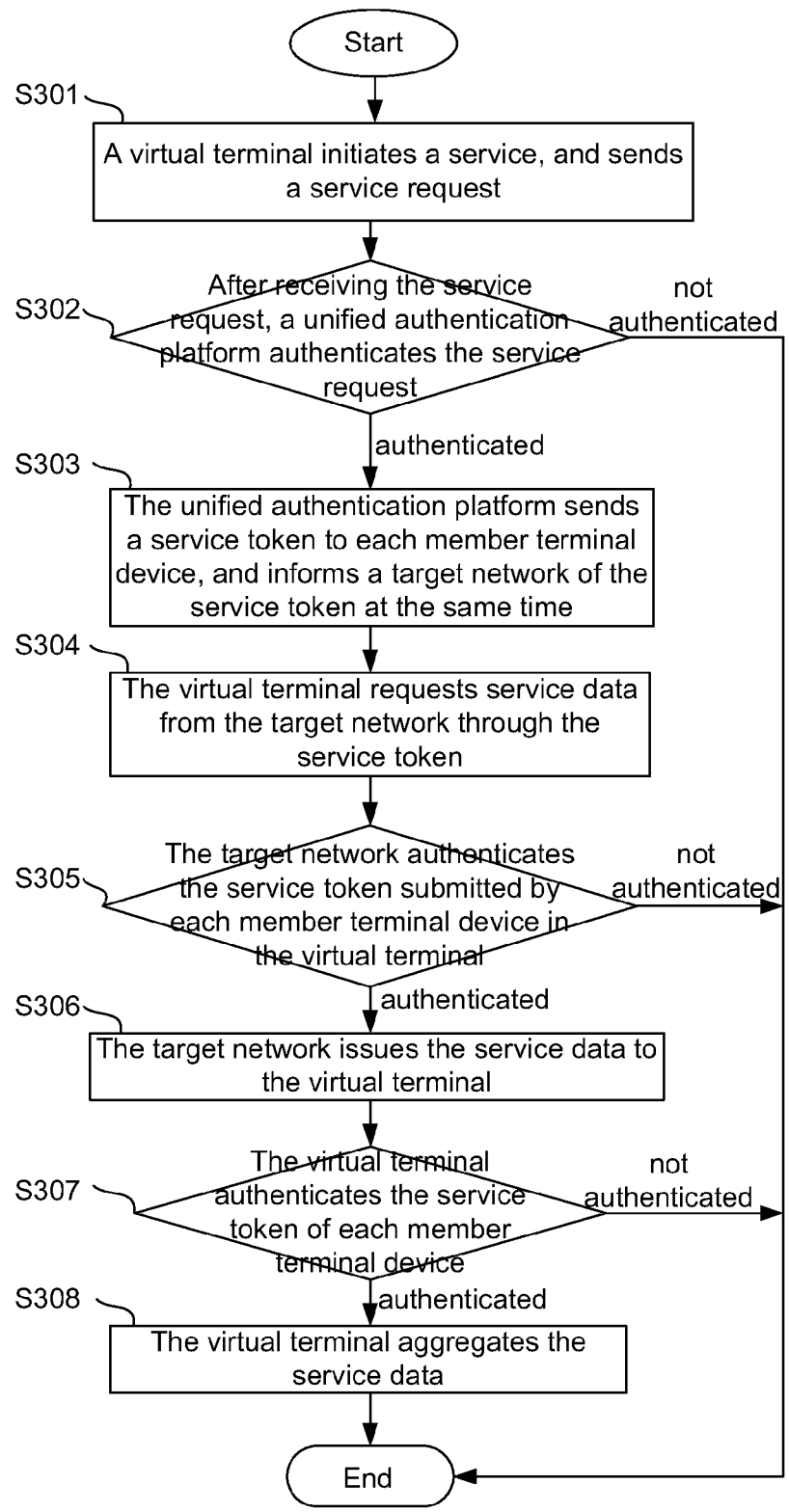
FIG. 3 is a flowchart of authentication in collaborative service download according to the disclosure.

FIG. 3 shows a flow of authentication in collaborative service download according to the disclosure, which may specifically include steps as follows.

In Step 301, a virtual terminal 101 initiates a service, and sends a service request.

In the step, the virtual terminal 101 receives a service requirement of a user, initiates a service and sends a service request to a unified authentication platform 100. The service request shall include at least information on: an identifier of the virtual terminal, an identifier of a member terminal device in the virtual terminal, a list of radio resources accessed by the member terminal device, a name of a service, and a type of the service.

In Step 302, receiving the service request, unified authentication platform 100 authenticates the service request. If the request is permitted, Step 303 is performed; or if the request is refused, the flow ends.

In the step, after the unified authentication platform 100 receives the service request sent by the virtual terminal 101, the unified authentication platform 100 authenticates the service request, mainly by: authenticating whether a target network is capable of providing ubiquitous service data required by a member terminal device in the virtual terminal according to a list of radio resources accessed by the member terminal device in the service request; allocating a corresponding heterogeneous network channel to the virtual terminal; and determining, according to the identifier of the virtual terminal and the identifier of each member terminal device in the virtual terminal in the service request, whether the virtual terminal and a member terminal device is authorized to download service data from the target network.

In Step 303, unified authentication platform 100 sends a service token to the virtual terminal, and informs a target network of the service token at the same time.

If the service request is authenticated, the unified authentication platform 100 generates the service token, sends the service token to the virtual terminal, and informs the target network of the service token. The service token should include at least information on: ID of the virtual terminal, ID of a member terminal device, a capability of the member terminal device, a radio resource accessed by the member terminal device, a name of a service being performed, a type of the service, an identifier of service data to be downloaded, and authorization to download the service data. If the service request is refused, the flow then ends.

In Step 304, the virtual terminal 101 requests service data from the target network through the service token.

In the step, the virtual terminal 101 submits the service token to the target network, and requests the target network to issue the service data.

In Step 305, the target network authenticates the service token submitted by the virtual terminal 101. If the request is permitted, Step 306 is performed; or if the request is refused, the flow ends.

In the step, the target network decrypts the service token submitted by the virtual terminal according to the information on the service token provided by the unified authentication platform, and authenticates information such as the ID of the virtual terminal, the ID of the member terminal device, the name of the service, the type of the service in the service token.

In the step, a type of service-token authentication may include centralized authentication, independent authentication and hybrid authentication. Implementation and applicability of each type of service-token authentication are shown in the table as follows.

| type of service-token authentication | Implementation | Applicability and advantages |
|---|---|---|
| Centralized authentication | A virtual terminal is authenticated collectively at a target network using a unified service token | Reduces signaling overhead during authentication, as well as service delay |

| type of service-token authentication | Implementation | Applicability and advantages |
|---|---|---|
| Independent authentication | Each member terminal device is authenticated at a target network using a service token of the member terminal itself | Applies to a terminal device having a specific requirement for authentication, and improves reliability and security of authentication |
| Hybrid authentication | Some member terminal devices adopt the centralized authentication, and an individual member terminal device adopts the independent authentication | different types of authentication are adopted according to device-specific conditions, leading to flexible efficient authentication |

In Step 306, the target network issues the service data to the virtual terminal 101.

In the step, after the service token of the virtual terminal 101 is authenticated by the target network, the target network issues service data to a corresponding member terminal device according to the identifier of the service data to be downloaded included in the service token.

In Step 307, the virtual terminal 101 authenticates the service token of each member terminal device. If it is authenticated, Step 308 is performed; or if it is not authenticated, the flow ends.

In the step, to ensure reliability and security of a source of service data downloaded by each member terminal device in the virtual terminal 101, the virtual terminal 101 authenticates the service token of each member terminal device in the virtual terminal.

In Step 308, the virtual terminal 101 aggregates the service data.

In the step, after the service token of each member terminal device in the virtual terminal 101 is authenticated by the virtual terminal 101, a controlling terminal aggregates the ubiquitous service required by the user according to the identifier of the service data included in each service token.

Figure 4:
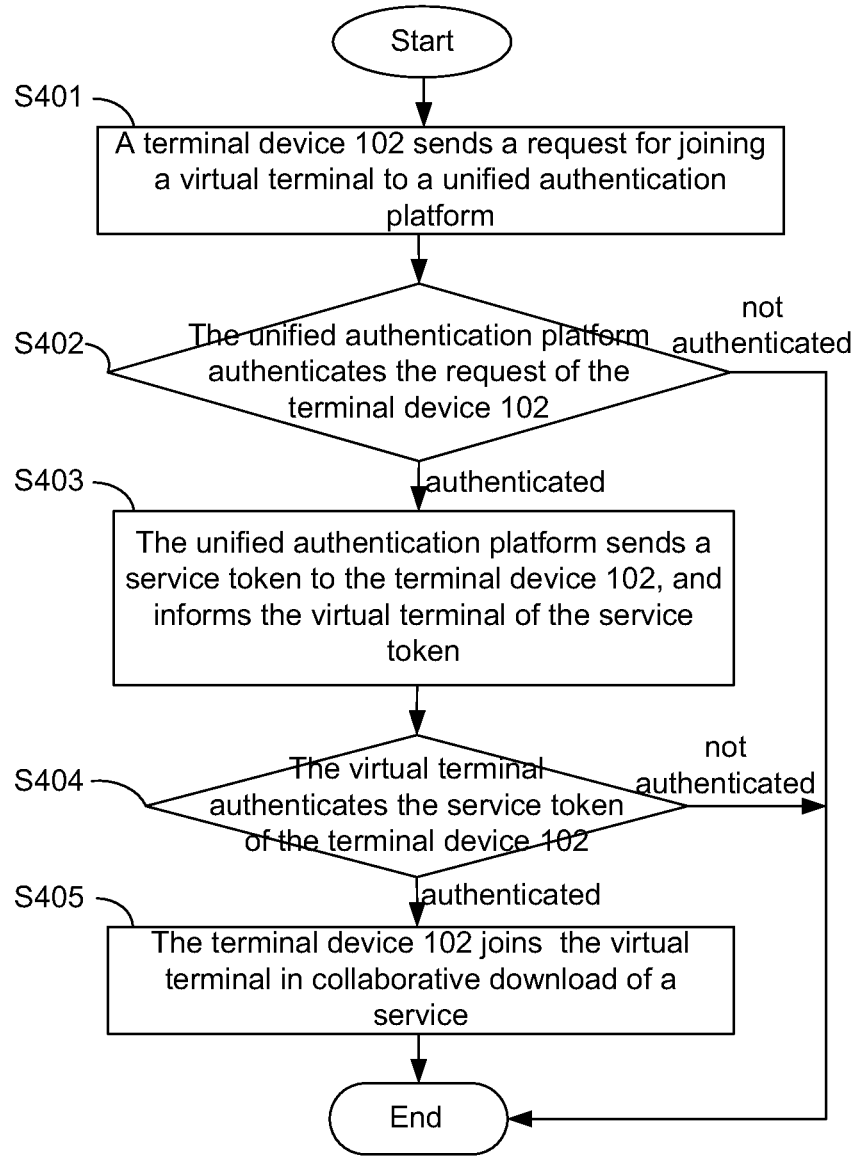
FIG. 4 is a flowchart of joining a virtual terminal by a terminal device according to the disclosure.

FIG. 4 is a flowchart of joining a virtual terminal by a terminal device provided by an embodiment of the disclosure. The flow may specifically include steps as follows.

In Step 401, a terminal device 102 sends a request for joining a virtual terminal to a unified authentication platform 100.

In the step, the virtual terminal 101 sends a call request to a surrounding device, and sends a call request to the unified authentication platform 100 at the same time. In response to the call request, the surrounding device sends the request for joining the virtual terminal 101 to the unified authentication platform. The request for joining the virtual terminal should at least include an ID of the terminal, terminal capability, a network access type and other information.

In Step 402, the unified authentication platform 100 authenticates the request of the terminal device 102. If the request is authenticated, Step 403 is performed. If it is not authenticated, the flow ends.

In the step, after the unified authentication platform 100 receives the request for joining the virtual terminal 101 from the terminal device 102, the unified authentication platform 100 extracts the terminal capability, the network access type and other information, and compares them with information of the call request sent by the virtual terminal. If the terminal capability, the network access type and other information of the terminal device 102 meet the requirement of the virtual terminal, the request is permitted.

In Step 403, the unified authentication platform 100 sends a service token to the terminal device 102, and informs the virtual terminal of the service token.

In the step, the terminal device 102 passes the authentication of the unified authentication platform; and the unified authentication platform sends the service token to the terminal device 102, and sends the service token to the virtual terminal, for providing a basis for the virtual terminal in authenticating the service token.

In Step 404, the virtual terminal authenticates the service token of the terminal device 102. If it is authenticated, Step 405 is performed; or if it is not authenticated, the flow ends.

In the step, the terminal device 102 submits the service token to the virtual terminal 101, and applies for joining the virtual terminal 101. The virtual terminal 101 decrypts the service token, and determines whether the service token is consistent with the service token provided from the unified authentication platform. If the service token is consistent with the service token provided from the unified authentication platform, the request is permitted. If the service token is inconsistent with the service token provided from the unified authentication platform, it is not authenticated.

In Step 405, the terminal device 102 joins the virtual terminal in collaboratively providing a ubiquitous service.

In the step, the terminal device 102 is admitted into the virtual terminal 101 by passing the service-token authentication by the virtual terminal 101, and collaborates with any other member terminal device to collectively provide the ubiquitous service, such as collectively providing a download service.

During the authentication in collaborative service download involved in FIG. 3, modes of service-token authentication may include the centralized authentication, the independent authentication and the hybrid authentication. Under the circumstance of a ubiquitous network, an appropriate mode of service-token authentication may be selected depending on a ubiquitous service and a specific requirement of a member terminal device in a virtual terminal. Therefore, with the embodiment of service-token authentication by a target network, three types of authentication, i.e., the centralized authentication, the independent authentication and the hybrid authentication, are proposed herein.

Figure 5:
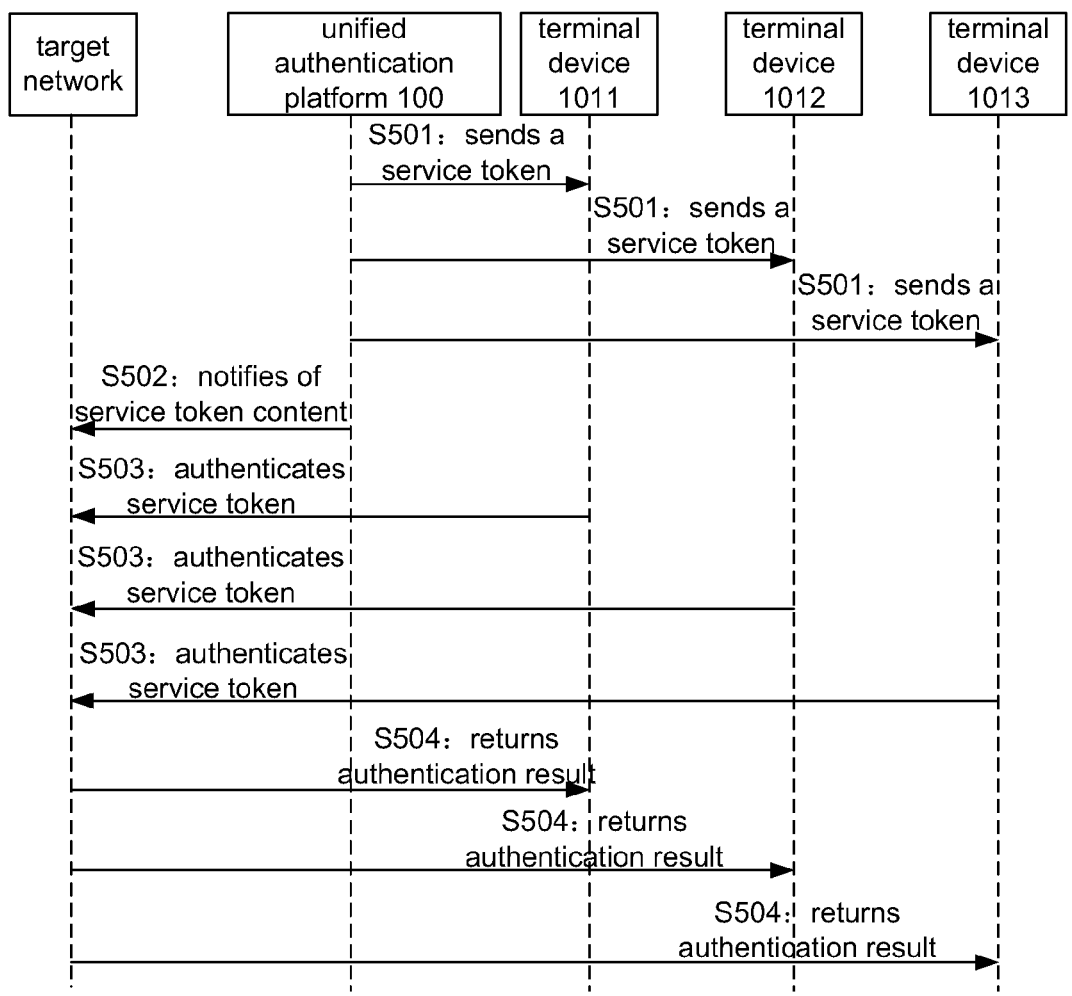
FIG. 5 is a flowchart of independent authentication according to the disclosure.

FIG. 5 is a flowchart of independent authentication according to the disclosure. The flow may specifically include steps as follows.

In Step 501, a unified authentication platform 100 sends a service token to a virtual terminal.

In the step, after the unified authentication platform authenticates a service request proposed by the virtual terminal, the unified authentication platform generates a service token of a respective member terminal device according to a specific condition of the respective member terminal device, and sends the service token of the respective member terminal device to the respective member terminal device.

In Step 502, the unified authentication platform 100 notifies a target network of information on any generated service token.

In the step, the unified authentication platform notifies the target network of information on the service token of each member terminal device in preparation for further authentication of service token content.

In Step 503. the respective member terminal device in the virtual terminal submits the service token of the respective member terminal device to the target network for authentication.

In the step, the respective member terminal device in the virtual terminal submits the service token of the respective member terminal device to a corresponding target network for authentication.

In Step 504, after the target network authenticates a service token, the target network returns an authentication result.

The target network decrypts a service token submitted by the virtual terminal according to the information on the service token provided by the unified authentication platform, and verifies consistency of information such as the ID of the virtual terminal, the ID of the respective member terminal device, the name of a service, the type of the service in the service token. If a service token is authenticated, the target network sends service data to a member terminal device corresponding to the service token. Or if a service token is not authenticated, the target network refuses to send service data to a member terminal device corresponding to the service token.

Figure 6:
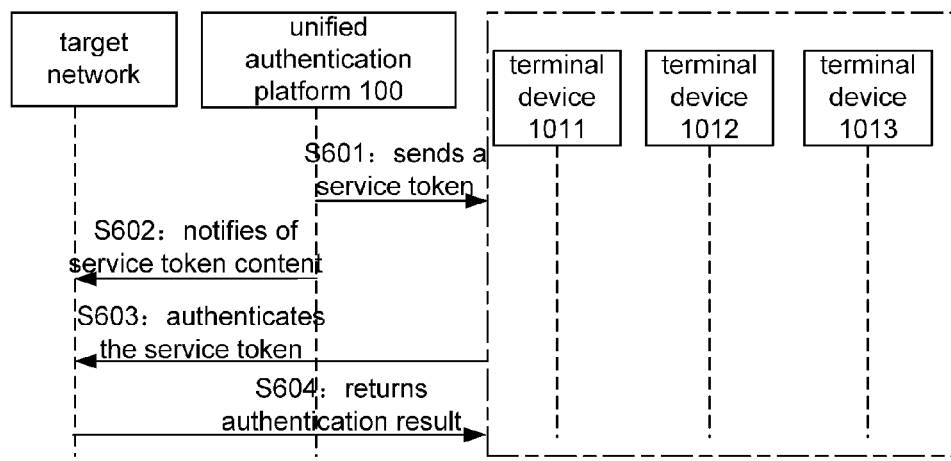
FIG. 6 is a flowchart of centralized authentication according to the disclosure.

FIG. 6 is a flowchart of centralized authentication according to the disclosure. The flow may specifically include steps as follows.

In Step 601, a unified authentication platform 100 sends a service token to a virtual terminal.

In the step, after the unified authentication platform authenticates a service request proposed by the virtual terminal, the unified authentication platform generates a unified service token of the virtual terminal according to detailed information on the virtual terminal, and sends the unified service token to a controlling terminal 1011 in the virtual terminal.

In Step 602, the unified authentication platform 100 notifies a target network of information on any generated service token.

In the step, the unified authentication platform notifies the target network of the information on the unified service token of the virtual terminal in preparation for further authentication of service token content.

In Step 603, the controlling terminal 1011 in the virtual terminal submits the unified service token to the target network for authentication.

In the step, the controlling terminal 1011 in the virtual terminal submits the unified service token to the target network for authentication.

In Step 604, after the target network authenticates the unified service token, the target network returns an authentication result.

The target network decrypts the unified service token submitted by the controlling terminal 1011, according to the information on the service token provided to the target network by the unified authentication platform, and verifies consistency of information such as the ID of the virtual terminal, the ID of a member terminal device, the name of a service, the type of the service in the service token. If the unified service token is authenticated, the target network sends service data to a member terminal device in the virtual terminal. Or if the unified service token is not authenticated, the target network refuses to send service data to a member terminal device in the virtual terminal.

Figure 7:
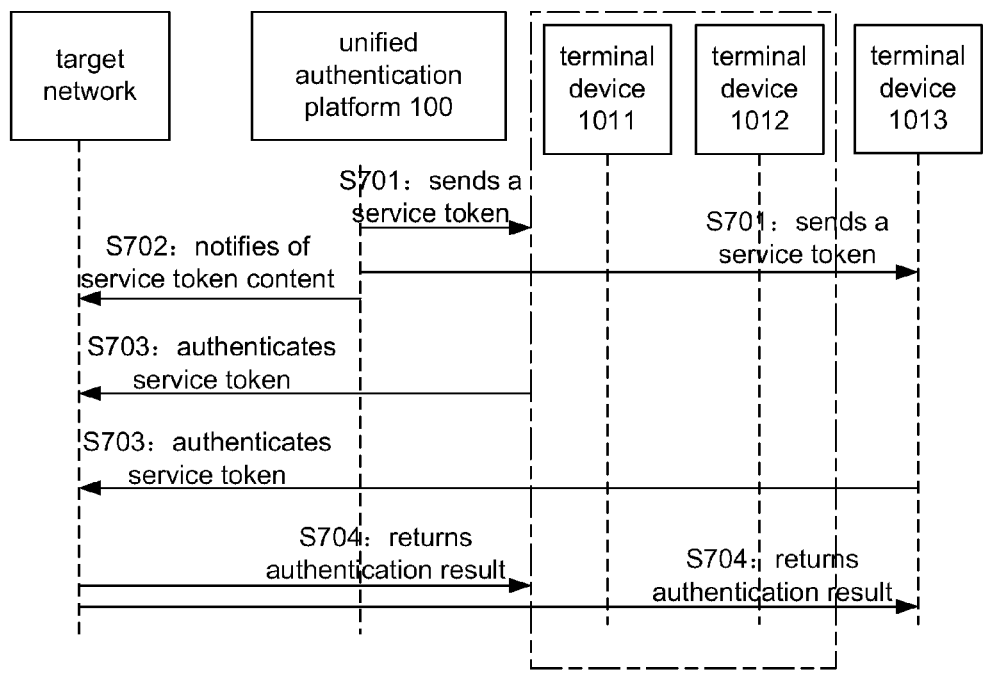
FIG. 7 is a flowchart of hybrid authentication according to the disclosure.

FIG. 7 is a flowchart of hybrid authentication according to the disclosure. The flow may specifically include steps as follows.

In Step 701, a unified authentication platform 100 sends a service token to a virtual terminal.

In the step, due to a reason such as a security level, a member terminal device 1013 in the virtual terminal requires a separate service token, which is to be authenticated in a target network separately. Therefore, after the unified authentication platform authenticates a service request proposed by the virtual terminal, the unified authentication platform puts, according to detailed information on the virtual terminal, a controlling terminal 1011 and a member terminal device 1012 into one group and sends the group a group service token, and sends a separate service token to the member terminal device 1013 due to a specific security requirement (for example, service data to be downloaded being confidential, or limited authorization of a terminal device).

In Step 702, the unified authentication platform 100 notifies a target network of information on any service token sent to the virtual terminal by the unified authentication platform.

In the step, the unified authentication platform notifies the target network of information on the service token of each member terminal device in preparation for further authentication of service token content.

In Step 703, a member terminal device in the virtual terminal holding a service token submits the service token of the member terminal device to the target network for authentication.

In the step, the controlling terminal 1011 and the member terminal device 1013 in the virtual terminal submit the group service token and the separate service token to the target network respectively for authentication.

In Step 704. after the target network authenticates a service token, the target network returns an authentication result.

The target network decrypts the service tokens submitted by the controlling terminal 1011 and the member terminal device 1013, and verifies consistency of information such as the ID of the virtual terminal, the ID of a member terminal device, the name of a service, the type of the service in the service token. If a service token is authenticated, the target network sends service data to a member terminal device corresponding to the service token. Or if a service token is not authenticated, the target network refuses to send service data to a member terminal device corresponding to the service token.

INDUSTRIAL APPLICABILITY

By a unified authentication platform, the disclosure unifies authentication systems in a ubiquitous network, reduces huge signaling overhead and service delay in a heterogeneous network due to authentication, and improves authentication efficiency in the ubiquitous network.

The invention claimed is:

1. An authentication method oriented to a heterogeneous network, comprising steps of:

after receiving a service request sent by a virtual terminal, generating, by a unified authentication server located at a core network layer, a service token according to the service request, and sending the service token to the virtual terminal and a target network;

submitting, by the virtual terminal, the service token to the target network, and requesting the target network to provide service data; and comparing, by the target network, the service token submitted by the virtual terminal with the service token sent to the target network by the unified authentication server, and providing the service data to the virtual terminal when the service token submitted by the virtual terminal is consistent with the service token sent to the target network by the unified authentication server, wherein the method further comprises steps of: after receiving the service request sent by the virtual terminal, authenticating, by the unified authentication server, whether a target network is capable of providing service data required by a member terminal device in the virtual terminal according to a list of radio resources accessed by the member terminal device in the service request; and determining, according to an identifier of the virtual terminal and an identifier of the member terminal device in the virtual terminal in the service request, whether the virtual terminal and the member terminal device is authorized to download service data from the target network; and when the target network is capable of providing the service data required by the member terminal device and the virtual terminal and the member terminal device is authorized to download the service data from the target network, generating, by the unified authentication server, the service token.

2. The method according to claim 1, wherein the unified authentication server generates a service token for a respective member terminal device in the virtual terminal;

the respective member terminal device in the virtual terminal submits the service token for the respective member terminal device to the target network; and the target network performs service-token comparison and authentication for the respective member terminal device in the virtual terminal according to the service token for the respective member terminal device.

3. The method according to claim 1, wherein the unified authentication server generates a unified service token for any member terminal device in the virtual terminal;

when the virtual terminal submits the service token to the target network, the virtual terminal submits the unified service token for any member terminal device in the virtual terminal to the target network; and the target network performs service-token comparison and authentication for any member terminal device in the virtual terminal according to the unified service token submitted by the virtual terminal.

4. The method according to any claim 1, wherein when the unified authentication server generates the service token, the unified authentication server provides a separate service token for an individual member terminal device in the virtual terminal, and provides a unified service token for any member terminal device in the virtual terminal other than the individual member terminal device in the virtual terminal provided with the separate service token;

a member terminal device in the virtual terminal provided with the unified service token submits the unified service token to the target network; and the member terminal device in the virtual terminal provided with the separate service token submits the separate service token to the target network; and the target network performs service-token comparison and authentication for a member terminal device in the virtual terminal provided with the unified service token according to the unified service token submitted by the virtual terminal, and performs service-token comparison and authentication for the member terminal device in the virtual terminal provided with the separate service token according to the separate service token submitted by the member terminal device in the virtual terminal provided with the separate service token.

5. The method according to claim 1, further comprising a step of:

when the target network compares and authenticates the service token submitted by the virtual terminal, issuing, by the target network, service data to a corresponding member terminal device according to the service token submitted by the virtual terminal.

6. The method according to claim 5, wherein after the virtual terminal obtains the service data provided by the target network, the virtual terminal aggregates the service data internally according to the service token.

7. The method according to claim 1, further comprising steps of: when a terminal device requires to join the virtual terminal, after receiving a request for joining the virtual terminal from the terminal device requiring to join the virtual terminal, determining, by the unified authentication server, according to a call request sent by the virtual terminal, whether the terminal device requiring to join the virtual terminal meets a requirement of the virtual terminal, wherein the request for joining the virtual terminal comprises at least: an identifier and a capability of the terminal device requiring to join the virtual terminal; and a type of a network accessed by the terminal device requiring to join the virtual terminal;

when the terminal device requiring to join the virtual terminal meets the requirement of the virtual terminal, sending, by the unified authentication server, the service token to the terminal device requiring to join the virtual terminal and the virtual terminal;

submitting, by the terminal device requiring to join the virtual terminal, the service token to the virtual terminal; and authenticating, by the virtual terminal, the service token submitted by the terminal device requiring to join the virtual terminal according to the service token sent to the virtual terminal by the unified authentication server, and admitting the terminal device requiring to join the virtual terminal as a member terminal device in the virtual terminal when the service token submitted by the terminal device requiring to join the virtual terminal is authenticated.

8. The method according to claim 1, wherein the service token is generated by the unified authentication server by collecting information on context of a user, the virtual terminal, a network and the service data and computing with an encryption algorithm, wherein the service token comprises at least information on: a name of the user, an identifier of the virtual terminal, an identifier of a member terminal device, a capability of the member terminal device, a radio resource accessed by the member terminal device, a name of a service being performed, a type of the service, a service data identifier, and authorization to download the service data.

9. An authentication system oriented to a heterogeneous network, comprising a unified authentication server located at a core network layer, a virtual terminal, and a target network, wherein the unified authentication server comprises a processor and a memory for storing instructions executable by the processor, wherein the processor is configured for receiving a service request sent by a virtual terminal, generating a service token according to the service request, and sending the service token to the virtual terminal and a target network;

the virtual terminal is configured for: sending the service request to the unified authentication server; after receiving the service token sent by the unified authentication server, submitting the service token to the target network, and requesting the target network to provide service data; and the target network is configured for: comparing the service token submitted by the virtual terminal with the service token sent to the target network by the unified authentication server, and providing the service data to the virtual terminal when the service token submitted by the virtual terminal is consistent with the service token sent to the target network by the unified authentication server, wherein the processor is further configured for: after receiving the service request sent by the virtual terminal, authenticating whether a target network is capable of providing service data required by a member terminal device in the virtual terminal according to a list of radio resources accessed by the member terminal device in the service request; and determining, according to an identifier of the virtual terminal and an identifier of the member terminal device in the virtual terminal in the service request, whether the virtual terminal and the member terminal device is authorized to download service data from the target network; and when the target network is capable of providing the service data required by the member terminal device and the virtual terminal and the member terminal device is authorized to download the service data from the target network, generating the service token.

10. The system according to claim 9, wherein the unified authentication server generates a service token for a respective member terminal device in the virtual terminal;

the respective member terminal device in the virtual terminal submits the service token for the respective member terminal device to the target network; and the target network performs service-token comparison and authentication for the respective member terminal device in the virtual terminal according to the service token for the respective member terminal device.

11. The system according to claim 9, wherein the unified authentication server generates a unified service token for any member terminal device in the virtual terminal;

when the virtual terminal submits the service token to the target network, the virtual terminal submits the unified service token for any member terminal device in the virtual terminal to the target network; and the target network performs service-token comparison and authentication for any member terminal device in the virtual terminal according to the unified service token submitted by the virtual terminal.

12. The system according to claim 9, wherein the unified authentication server provides a separate service token for an individual member terminal device in the virtual terminal, and provides a unified service token for any member terminal device in the virtual terminal other than the individual member terminal device in the virtual terminal provided with the separate service token;

a member terminal device in the virtual terminal provided with the unified service token submits the unified service token to the target network; and the member terminal device in the virtual terminal provided with the separate service token submits the separate service token to the target network; and the target network performs service-token comparison and authentication for a member terminal device in the virtual terminal provided with the unified service token according to the unified service token submitted by the virtual terminal, and performs service-token comparison and authentication for the member terminal device in the virtual terminal provided with the separate service token according to the separate service token submitted by the member terminal device in the virtual terminal provided with the separate service token.

13. The system according to claim 9, wherein the processor is configured for: receiving the service request sent by the virtual terminal, and authenticating information on identities and authorizations of a user and the virtual terminal; helping management of the virtual terminal by a controlling terminal in the virtual terminal; and authenticating a terminal device requiring to join the virtual terminal, and determining whether the terminal device requiring to join the virtual terminal is authorized to join the virtual terminal;

receiving and authenticating the service request sent by the virtual terminal; and responding to the service request of the user by authenticating information on service content, service data and a service attribute and completing collaborative download in the virtual terminal for a service involving a heterogeneous network; and generating, authenticating and managing the service token, wherein the service token is generated by the unified authentication server by collecting information on context of the user, the virtual terminal, a network and a service and computing with an encryption algorithm, wherein the service token comprises at least information on: a name of the user, an identifier of the virtual terminal, an identifier of a member terminal device, a capability of the member terminal device, a radio resource accessed by the member terminal device, a name of the service being performed, a type of the service, a service data identifier, and authorization to download the service data.

14. The system according to claim 9, wherein the virtual terminal comprises a controlling terminal and a member terminal device, wherein the controlling terminal is configured for: managing the member terminal device; providing the virtual terminal with a collaborative management capability comprising storing information on a status in performing a service and a capability of the member terminal device; sending the service request to the unified authentication server; admitting a terminal device as a member terminal device with the help of the unified authentication server; and formulating a service-transmission-by-streams strategy according to authorization of the service token, and downloading required service data from a network side; and the member terminal device is configured for: carrying out the service-transmission-by-streams strategy of the controlling terminal through the service token; collaborating with the controlling terminal in completing a service task; and collaborating with the controlling terminal in completing service aggregation within the virtual terminal.

15. The method according to claim 2, wherein
the service token is generated by the unified authentication server by collecting information on context of a user, the virtual terminal, a network and the service data and computing with an encryption algorithm, wherein the service token comprises at least information on: a name of the user, an identifier of the virtual terminal, an identifier of a member terminal device, a capability of the member terminal device, a radio resource accessed by the member terminal device, a name of a service being performed, a type of the service, a service data identifier, and authorization to download the service data.

16. The method according to claim 3, wherein
the service token is generated by the unified authentication server by collecting information on context of a user, the virtual terminal, a network and the service data and computing with an encryption algorithm, wherein the service token comprises at least information on: a name of the user, an identifier of the virtual terminal, an identifier of a member terminal device, a capability of the member terminal device, a radio resource accessed by the member terminal device, a name of a service being performed, a type of the service, a service data identifier, and authorization to download the service data.

17. The method according to claim 4, wherein
the service token is generated by the unified authentication server by collecting information on context of a user, the virtual terminal, a network and the service data and computing with an encryption algorithm, wherein the service token comprises at least information on: a name of the user, an identifier of the virtual terminal, an identifier of a member terminal device, a capability of the member terminal device, a radio resource accessed by the member terminal device, a name of a service being performed, a type of the service, a service data identifier, and authorization to download the service data.

18. The method according to claim 5, wherein
the service token is generated by the unified authentication server by collecting information on context of a user, the virtual terminal, a network and the service data and computing with an encryption algorithm, wherein the service token comprises at least information on: a name of the user, an identifier of the virtual terminal, an identifier of a member terminal device, a capability of the member terminal device, a radio resource accessed by the member terminal device, a name of a service being performed, a type of the service, a service data identifier, and authorization to download the service data.

19. The method according to claim 6, wherein
the service token is generated by the unified authentication server by collecting information on context of a user, the virtual terminal, a network and the service data and computing with an encryption algorithm, wherein the service token comprises at least information on: a name of the user, an identifier of the virtual terminal, an identifier of a member terminal device, a capability of the member terminal device, a radio resource accessed by the member terminal device, a name of a service being performed, a type of the service, a service data identifier, and authorization to download the service data.

20. The method according to claim 7, wherein
the service token is generated by the unified authentication server by collecting information on context of a user, the virtual terminal, a network and the service data and computing with an encryption algorithm, wherein the service token comprises at least information on: a name of the user, an identifier of the virtual terminal, an identifier of a member terminal device, a capability of the member terminal device, a radio resource accessed by the member terminal device, a name of a service being performed, a type of the service, a service data identifier, and authorization to download the service data.

* * * * *